(12) United States Patent
Patterson et al.

(10) Patent No.: US 6,289,104 B1
(45) Date of Patent: Sep. 11, 2001

(54) FREE-SPACE QUANTUM CRYPTOGRAPHY SYSTEM

(75) Inventors: David B. Patterson, LaGrange; James M. Kubik, Westmont, both of IL (US)

(73) Assignee: Ilinois Institute of Technology, Chicago, IL (US)

(*) Notice: Subject to any disclaimer, the term of this patent is extended or adjusted under 35 U.S.C. 154(b) by 0 days.

(21) Appl. No.: 09/131,015

(22) Filed: Aug. 7, 1998

(51) Int. Cl.[7] ............................................. H04L 9/08
(52) U.S. Cl. ........................... 380/283; 380/256; 380/44; 359/112
(58) Field of Search .................... 380/256, 283, 380/270, 44, 46, 31; 359/112, 157, 158, 173

(56) References Cited

U.S. PATENT DOCUMENTS

| | | |
|---|---|---|
| 3,944,822 | 3/1976 | Dzubay . |
| 4,965,856 * | 10/1990 | Swanic ................... 359/112 |
| 5,175,434 | 12/1992 | Engdahl . |
| 5,243,649 | 9/1993 | Franson . |
| 5,307,410 | 4/1994 | Bennett . |
| 5,339,182 | 8/1994 | Kimble et al. . |
| 5,418,905 | 5/1995 | Rarity et al. . |
| 5,515,438 | 5/1996 | Bennett et al. . |
| 5,528,406 | 6/1996 | Jeffrey et al. . |
| 5,604,806 | 2/1997 | Hassan et al. . |
| 5,675,648 * | 10/1997 | Townsend ..................... 380/278 |
| 5,757,912 * | 5/1998 | Blow ............................ 380/256 |
| 5,764,765 * | 6/1998 | Phoenix et al. ............... 380/283 |
| 5,966,224 * | 10/1999 | Hughes et al. ................ 359/112 |
| 5,999,285 * | 12/1999 | Brandt et al. ................. 359/112 |

* cited by examiner

*Primary Examiner*—Gilberto Barrón, Jr.
*Assistant Examiner*—Ho S. Song
(74) *Attorney, Agent, or Firm*—Pauley Petersen Kinne & Fejer

(57) ABSTRACT

A system and method for quantum key delivery in a single-photon, free-space cryptography scheme including a transmitter and a receiver. The transmitter includes two pairs of photon sources, each of which represents a specific photon polarization direction. The first pair of photon sources represents a first polarization basis while the remaining pair of photon sources represents a second polarization basis. The first and second polarization basis are rotated with respect to each other so as to produce non-orthogonal polarization eigenstates. A transmitter polarizing beamsplitter corresponding to each of the pairs of the photon sources is provided whereby the polarizations of each of the photon sources of each pair of photon sources are recombined. A transmitter non-polarizing beamsplitter is provided whereby the recombined polarizations are combined for output to the receiver. The receiver includes a set of optics inversely disposed with respect to the optics of the transmitter and two pairs of photon detectors.

17 Claims, 2 Drawing Sheets

FREE-SPACE QUANTUM CRYPTOGRAPHY SYSTEM

BACKGROUND OF THE INVENTION

1. Field of the Invention

This invention relates to a system and method for key delivery using quantum cryptography. The system allows for delivery of single photons from a transmitter to a receiver, with information contained in the polarization states of the photons. The system eliminates expensive, unstable, complicated components, called Pockels cells, used in prior designs and replaces them with less expensive passive components and additional optical sources. Benefits arising from use of the system of this invention include system speed, stability and simplicity. In addition, the receiver design permits single photon operation in daylight conditions.

2. Description of Prior Art

Generally, quantum cryptography is a system which enables two parties to communicate in secret with the security of the communication being guaranteed by the laws of quantum physics. More particularly, a quantum cryptography system is a key distribution system that attempts to link the security of the system to the correctness of the uncertainty principle of quantum mechanics. The essence of the uncertainty principle is twofold. First, any measurements made on a physical system that extracts some information about that system will necessarily disturb that system albeit perhaps only in a minimal way. Second, any measurement made on a physical system that extracts some information about a certain quantity, call it x, necessarily precludes obtaining information about a conjugate quantity of the same system, call it p. Quantum cryptography systems are designed such that a sender prepares a physical system in a known quantum state of x or p and transmits it to a legitimate receiver. At the receiver, the value of either x or p for the physical system is measured; however, due to the uncertainty principle, the measurement of the values of both x and p is precluded. A large number of such exchanges between the transmitter and the receiver are made after which a comparison is made between the information sent and the information received. Information received by the receiver in a measurement of the conjugate quantity to that sent by the transmitter is discarded. In addition, events of unsuccessful transmission, due to the failure of arrival of the quantum state or the arrival of multiple quantum states, are discarded. In the absence of an eavesdropper, as well as the use of ideal equipment, the values of the quantities for each of the retained pieces of information would be common to both the transmitter and the receiver and can then be used as a key. Due to the uncertainty principle, if an eavesdropper extracts some information about the system by making a measurement, the system will be perturbed and the existence of the eavesdropper known.

Applications of such a system have been proposed for key delivery to satellites, aircraft, ships, and submarines, where physical delivery of a key is impossible. As computing power increases, standard mathematical encryption algorithms become susceptible to attack. However, the quantum uncertainty built into the system of this invention is completely unbreakable. As a result, the system has applicability in military, government and financial communication systems.

More particularly, a quantum cryptography system operates by transmitting key information in the form of the polarization state of a single photon. For example, a "0" bit could be transmitted in a horizontally polarized direction while a "1" bit could be transmitted in a vertically polarized direction. If one measures the photon polarization at the receiver in the same basis as the transmitter, the correct bit value is found. However, if one measures the photon polarization in a basis that is rotated (for example at 45° to the correct basis), then the precise bit value cannot be determined. Photons in one of two non-orthogonal basis systems are then transmitted with the polarization direction in the system defining the bit value. A measurement on the polarization state of the photon will destroy information on the input polarization state as a result of which any attempt to eavesdrop on the system will perturb the system in a detectable manner.

A conventional system for quantum key delivery comprising transmitter 10 and receiver 20 is shown in FIG. 1. Here, a single optical source, such as a pulsed laser diode 11, generates a weak pulse, with a mean photon number per pulse of one or less after passing through linear polarizer 13. A random digital signal (on or off) is sent to a half-wave Pockels cell 12 which either transmits the original polarization or rotates the polarization direction by 90°. This cell is called the bit-value selection cell 14 because it determines whether a 0 or a 1 is sent. A second random digital signal is sent to a quarter-wave Pockels cell which either transmits the input polarization or converts the polarization to a circular polarization state. The direction of circular polarization (left or right) depends on the bit value. This second cell is referred to as a transmitter basis selection cell 15. At receiver 20, a third, quarter-wave Pockels cell 12 is used. When a signal is applied to this cell, it converts circular polarization to linear polarization, and vice versa. With no signal applied, the polarization state is unchanged in propagation through the cell. This cell serves to determine the polarization basis that can be separated by the following polarizing beamsplitter 22 and, thus, this cell is referred to as a receiver basis selection cell 21. With the correct basis selected, the polarizing beamsplitter 22 directs the photon to the photomultiplier tube 23 corresponding to the correct bit value. If the incorrect measurement basis is used, either photomultiplier tube 23 will detect the photon with equal probability, yielding no information on the photon state.

This conventional system suffers from several drawbacks. First, the maximum data rate is limited by the switching speed of the Pockels cells 12, which is typically 1 Mb/s. Secondly, the Pockels cells phase retardation (and, thus, polarization control) is highly temperature dependent, drifting significantly with environmental changes. Thirdly, the Pockels cells and their driver electronics are quite expensive, with prices for a single unit near $3,500. Finally, because the system uses single photons, all ambient light must be blocked from the photomultiplier tubes 23 used as detectors, requiring near-total darkness for operation.

A similar system to that shown in FIG. 1 is taught by U.S. Pat. No. 5,243,649 in which a pulsed laser produces a single photon by attenuating a high-intensity pulse and, using Pockels cells, one observer rotates the polarization of the photons through a selected angle of rotation while a second observer measures the polarization and obtains total correlation (same polarization). Thus, any interception of the photon will destroy the correlation. This system design incorporates four (4) Pockels cells, polarization preserving optical fiber, and a feedback loop for phase drift compensation.

Other key distribution systems using quantum cryptography are taught, for example, by U.S. Pat. No. 5,675,648 in which a common transmission medium is used for the quantum channel and the public channel and a calibration signal is transmitted over the public channel on the common transmission medium to calibrate the system for subsequent transmission of a key on the quantum channel. In accordance with the teachings thereof, the transmission medium may be an optical fiber and the transmitter may switch between a single photon output and a multiple photon output to provide the quantum channel and the public channel, respectfully. U.S. Pat. No. 5,307,410 teaches an interferometric quantum cryptographic key distribution system comprising a quantum channel for conveying dim and bright reference light pulses, a timing channel, a source of coherent light pulses, beam supporters, a random number generator, a phase modulator, and a memory for recording the phase of transmitted dim light pulses; and U.S. Pat. No. 5,339,182 teaches a method and apparatus for quantum communication employing non-classical correlations of quadrature-phase amplitudes where, in order to achieve non-classical transmission effects, a nondegenerate optical parametric amplifier is employed to generate a pair of signal beams having a highly correlated quantum noise and information is then encoded within each of the signal beams at a signal level far below the level of the quantum noise. As a result, information encoded on the beam is substantially obscured by the quantum noise, thereby effectively preventing unwanted eavesdropping on the transmitted information. After transmission, the pair of separate signals are detected and combined by a receiver. The highly correlated quantum noise is eliminated from the signals, leaving substantially only the encoded information. The resulting information signal has a minimum noise level below that which can be achieved using non-classical techniques.

SUMMARY OF THE INVENTION

Accordingly, it is one object of this invention to provide a system for quantum key delivery in a single-photon, free-space cryptography scheme.

It is another object of this invention to provide a system for quantum key delivery capable of accommodating a maximum data rate greater than the switching speed of the Pockels cells utilized in conventional systems.

It is another object of this invention to provide a quantum key delivery system which eliminates drift of the polarization rotation of the Pockels cells due to temperature and environmental changes.

It is yet another object of this invention to provide a quantum key delivery system which avoids the use of Pockels cells and their driver electronics, thereby resulting in substantially reduced costs over conventional systems.

It is yet another object of this invention to provide a quantum key delivery system which is capable of daylight operation.

These and other objects of this invention are achieved by a system for quantum key delivery in a single-photon, free-space cryptography scheme comprising a transmitter comprising two pairs of photon sources where each photon source represents a specific photon polarization direction. One pair of photon sources represents a first polarization basis while the remaining pair of photon sources represents a second polarization basis. The first polarization basis and the second polarization basis are prepared as conjugate bases, either through physical rotation of the optical systems or through the use of optical retardation plates in the paths of the optical beams, resulting in non-orthogonal polarization eigenstates. Retardation plates are crystals which modify the polarization state of an optical beam from input to output of the crystal. The transmitter further comprises a polarizing beamsplitter for each pair of photon sources whereby the polarizations of each photon source of each pair of photon sources is recombined. In addition, a non-polarizing beamsplitter is provided whereby the recombined polarizations are combined for output to a receiver.

The receiver comprises a non-polarizing beamsplitter whereby the output from the transmitter is separated, resulting in a random basis selection. Two pairs of photon receivers and a receiver polarizing beamsplitter corresponding to each pair of photon receivers are provided, with the photon receivers and receiver polarizing beamsplitters being disposed inversely with respect to the photon sources and the transmitter polarizing beamsplitters. The receiver is in communication with the transmitter through a free-space channel in which, in accordance with one particularly preferred embodiment, is disposed a spatial filter. The spatial filter comprises at least two optically aligned lenses and an optical barrier disposed between the optically aligned lenses, the optical barrier forming a pinhole aligned with the optically aligned lenses. The presence of the spatial filter provides highly accurate angular resolution at the receiver. This fine resolution decreases the ambient light levels by 8–10 orders of magnitude, thereby making daylight operation possible.

In accordance with the method of this invention for quantum key delivery in a single-photon, free-space system, a photon having a polarization direction corresponding to a bit value is transmitted from one of two non-orthogonal transmitter basis systems through a transmitter polarizing beamsplitter, through a transmitter non-polarizing beamsplitter and through an output of a transmitter. The photon is preferably passed through a spatial filter disposed in a free-space channel between the transmitter and a receiver. Thereafter, the photon is passed through a receiver non-polarizing beamsplitter, through a receiver polarizing beamsplitter corresponding to one of two non-orthogonal receiver basis systems, and to one of two photon detectors within one of the two non-orthogonal receiver basis systems.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
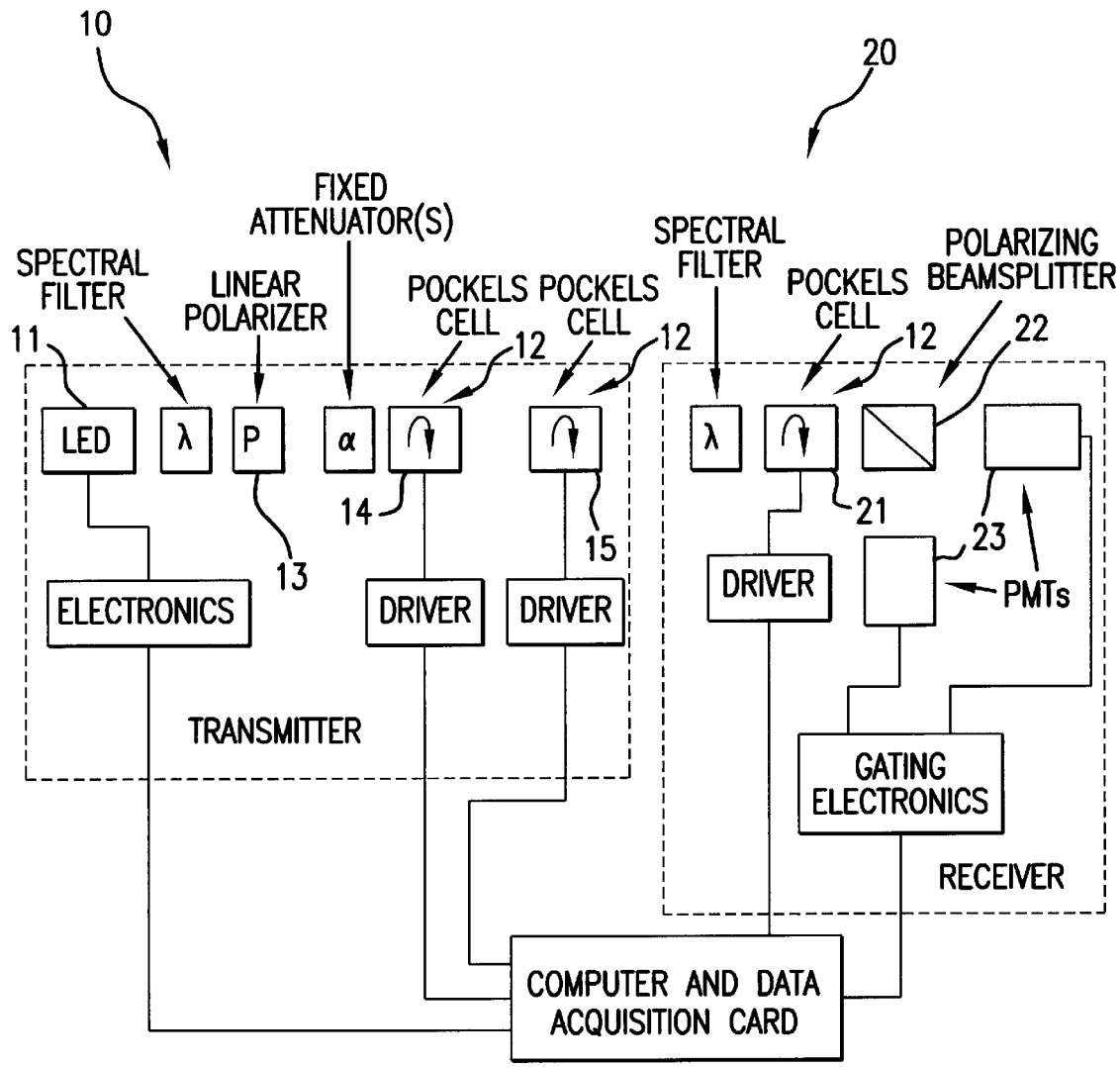
FIG. 1 is a diagram showing a conventional system for quantum key delivery.
Figure 2:
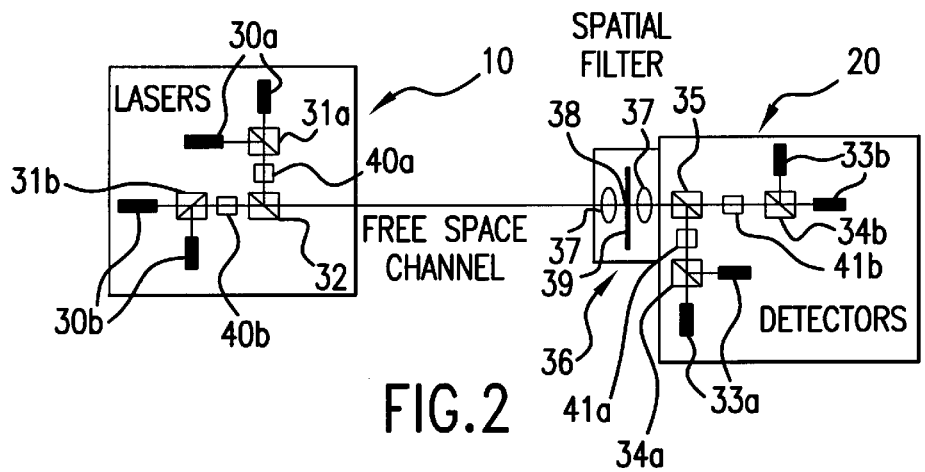
FIG. 2 is a schematic diagram showing a quantum cryptography system in accordance with one embodiment of this invention.

FIG. 2 is a schematic diagram of a system for quantum key delivery in a single-photon, free-space cryptography scheme in accordance with one embodiment of this invention. The system comprises a transmitter 10 and a receiver 20 in communication with each other through a free-space channel. Disposed within the free-space channel is a spatial filter 36 comprising a combination of lenses 37 and a small pinhole 38, thereby providing highly accurate angular resolution at receiver 20. As previously stated, this fine resolution decreases the ambient light levels by 8–10 orders of magnitude and makes daylight operation possible. It will be apparent to those skilled in the art that operation of the system of this invention without a spatial filter is feasible if one is willing and able to operate under low light or darkness conditions.

Transmitter 10 comprises two pairs of photon sources 30a and 30b, in the embodiment shown in the form of lasers, each said photon source representing a specific photon polarization direction. Each pair of photon sources (lasers or light emitting diodes) 30a and 30b represent polarization bases which have been prepared as conjugate bases, either through physical rotation of the optical systems with respect to each other or preferably through the use of at least one optical retardation plate 40a, 40b disposed in at least one of the optical beam paths, resulting in non-orthogonal polarization eigenstates. Transmitter 10 further comprises transmitter polarizing beamsplitters 31a and 31b corresponding to each pair of photon sources 30a and 30b whereby the polarizations of each pair of photon sources 30a and 30b are recombined. A transmitter non-polarizing beamsplitter 32 is provided whereby the recombined polarizations from the transmitter polarizing beamsplitter 31a and 31b are combined for output to receiver 20.

Receiver 20 as shown in FIG. 2 comprises a set of optics inverse with respect to the optics of transmitter 10. Specifically, receiver 20 comprises a receiver non-polarizing beamsplitter 35 whereby the output from transmitter 10 is separated, resulting in a random basis selection between one of two polarization bases defined by a pair of photon receivers or detectors 33a and 33b and corresponding receiver polarizing beamsplitters 34a and 34b. As in the case of the transmitter, the polarization bases of the receiver are prepared as conjugate bases, either through physical rotation of the optical systems with respect to each other or preferably through the use of at least one optical retardation plate 41a, 41b disposed in at least one of the optical beam paths in the receiver.

Disposed within the free-space channel between transmitter 10 and receiver 20 at the receiver photon input is spatial filter 36 comprising at least two optically aligned lenses 37 and an optical barrier 39 disposed between optically aligned lenses 37 and forming pinhole 38 aligned with optically aligned lenses 37.

Figure 3:
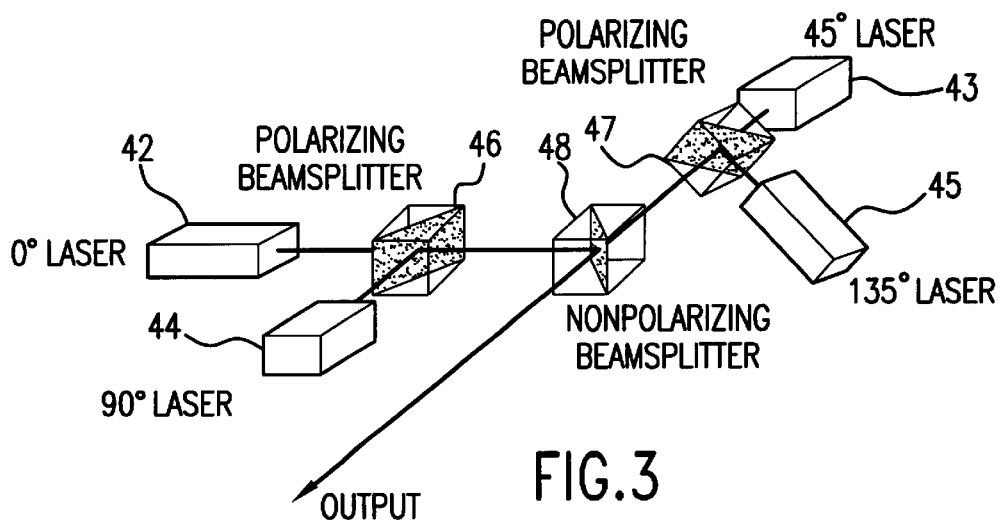
FIG. 3 is a schematic diagram of a quantum cryptography source (transmitter) in accordance with one embodiment of this invention.

The most significant feature of the system for quantum key delivery in a single-photon, free-space cryptography scheme in accordance with this invention compared to conventional systems is the elimination of Pockels cells. Instead of a single source with a polarization selected by Pockels cell voltages, the system of this invention comprises four individual sources 42, 43, 44, 45 as shown in FIG. 3. Each source 42, 43, 44, 45 represents a specific polarization direction. In FIG. 3, two linear polarization bases, rather than one linear polarization basis and one circular basis, have been selected for convenience. Each basis represented by a pair of photon sources 42, 44 and polarizing beamsplitter 46 and photon sources 43, 45 and polarizing beamsplitter 47 are rotated by 45° with respect to each other so that the polarization eigenstates of the different bases are not orthogonal. Alternatively, the bases are prepared as conjugate bases through the use of at least one optical retardation plate disposed in at least one of the optical beam paths within the transmitter. This non-orthogonality is critical to the secure operation of the quantum cryptographic system of this invention. Within each linear polarization basis, photon sources 42, 44 or 43, 45 are aligned so that their selected polarization may be recombined with polarizing beamsplitters 46 and 47, respectfully. The combined beams from each polarization basis are then combined by non-polarizing beamsplitter 48 for output to a receiver. By randomly exciting one of the four photon sources 42, 44, 43, 45, the polarization state of the output photon is randomly determined but known to transmitter 10.

Figure 4:
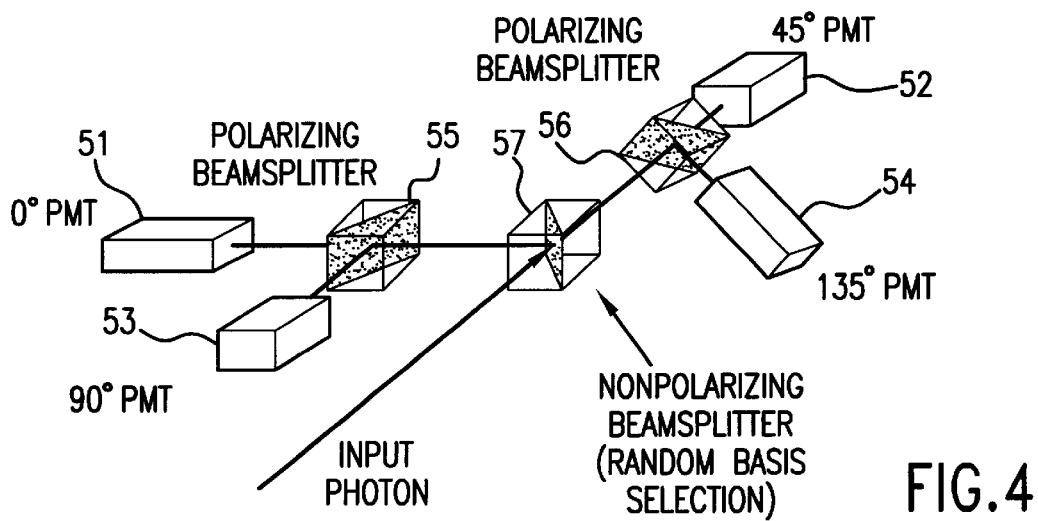
FIG. 4 is a diagram showing a quantum cryptography receiver in accordance with one embodiment of this invention.

At the receiver, as shown in FIG. 4, a set of optics inverse to the optics of transmitter 10 is located. First, non-polarizing beamsplitter 57 is used to separate the input beam from transmitter 10. Because a single photon is incident on non-polarizing beamsplitter 57, the photon will take one of two possible output paths with equal probability. This random event constitutes the basis selection of receiver 20. If the photon propagates through the 0°–90° path, represented by detectors 51, 53 and polarizing beamsplitter 55, the polarization state of the photon will be measured in that basis. If the photon propagates through the 45°–135° path, as represented by detector 52, 54 and polarizing beamsplitter 56, its polarization state will be measured in that basis. As a result, the receiver 20, by detecting the presence of photon counts by the four possible detectors 51, 53, 52, 54 can determine the measurement basis and the bit value measured in that basis.

At this point, the secret key is extracted by a standard algorithm. First, the transmitter and receiver polarization bases are compared for each bit, and cases of mismatched basis are discarded, as no bit information can be determined from a single photon. Next, occurrences of zero or more than one photon count are reported by the receiver and discarded. Finally, the useful data are filtered of errors using a parity-checking string bisection routine that is guaranteed to preserve bit secrecy.

The method for quantum key delivery in a single-photon, free-space system in accordance with this invention comprises the steps of transmitting a photon having a polarization direction corresponding to a bit value from one of two non-orthogonal transmitter basis systems through a transmitter polarizing beamsplitter, transmitting the output from the transmitter beamsplitter through a transmitter non-polarizing beamsplitter, and transmitting the output from the transmitter non-polarizing beamsplitter through an output of a transmitter. The photon, having passed through the output of the transmitter passes through a non-polarizing beamsplitter disposed within a receiver. The photon passes through the receiver non-polarizing beamsplitter, taking one of the two possible output paths to one of two receiver polarizing beamsplitters corresponding to one of two non-orthogonal receiver basis systems within the receiver. From the polarizing beamsplitter, the photon is then passed to one of two photon detectors within one of the two randomly selected non-orthogonal receiver basis systems. In accordance with a particularly preferred embodiment of this invention, the photon, having been emitted by the transmitter, passes through a spatial filler disposed in the free-spaced channel between the transmitter and receiver prior to Its incidence upon the receiver non-polarizing beamsplitter.

It will be apparent to those skilled in the art that, although the invention has been described in terms of non-orthogonal bases which are linear, any two polarization bases that are conjugate bases many be used. By the term conjugate basis, we mean a system in which the basis vector of one basis system projects with equal magnitude on the basis vector of the conjugate basis system. Thus, for example, circular and elliptical polarizations may also be employed in the method and apparatus of this invention.

It will also be apparent to those skilled in the art that in order for the system of this invention to work properly, optical alignment of the system elements is critical. To reduce the criticality of the optical alignment of the elements of the system, in accordance with one embodiment of this invention, the transmitter comprises at least one optical fiber disposed at the transmitter output through which the photons generated by the transmitter are output to the receiver.

It will further be apparent to those skilled in the art that any suitable photon detectors may be utilized in the receiver of this invention. In accordance with a particularly preferred embodiment of this invention, the detectors used in the receiver are photomultiplier tubes or avalanche photo diodes in a Geiger mode.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A system for quantum key delivery in a single-photon, free-space cryptography scheme comprising:

a transmitter comprising two pairs of photon sources, each said photon source representing a specific photon polarization direction, a first said pair of photon sources representing a first polarization basis and a remaining said pair of photon sources representing a second polarization basis, said first polarization basis and said second polarization basis prepared as conjugate bases by one of being rotated with respect to each other and disposition of at least one retardation plate in a transmitter path of a photon emitted by at least one of said photon sources resulting in non-orthogonal polarization eigenstates, a transmitter polarizing beamsplitter corresponding to each said pair of photon sources whereby the polarizations of each said photon source of each said pair of photon sources are recombined, a transmitter non-polarizing beamsplitter whereby said recombined polarizations are combined for output to a receiver, and a photon output; and a receiver comprising a photon input, a receiver non-polarizing beamsplitter whereby said output from said transmitter is separated resulting in a random polarization basis selection, two pairs of photon receivers and a receiver polarizing beamsplitter corresponding to each said pair of photon receivers, said photon receivers and said receiver polarizing beamsplitters disposed inversely with respect to said photon sources and said receiver polarizing beamsplitters having been prepared as conjugate bases by one of being rotated with respect to each other and disposition of at least one retardation plate in a receiver path of a photon received by at least one of said photon receivers, said receiver in communication with said transmitter through a free-space channel.

2. A system in accordance with claim 1, wherein a spatial filter is disposed at said photon input of said receiver.

3. A system in accordance with claim 2, wherein said spatial filter comprises at least two optically aligned lenses and an optical barrier disposed between said optically aligned lenses and forming a pinhole aligned with said optically aligned lenses.

4. A system in accordance with claim 1, wherein said photon output comprises at least one optical fiber.

5. A system in accordance with claim 4, wherein said photon receivers are photomultiplier tubes.

6. A system in accordance with claim 4, wherein said photon receivers are avalanche photo diodes in a Geiger mode.

7. A system in accordance with claim 1, wherein said photon sources are selected from the group consisting of lasers and light emitting diodes.

8. A system in accordance with claim 1, wherein said photon receivers are photomultiplier tubes.

9. A system in accordance with claim 1, wherein said photon receivers are avalanche photo diodes in a Geiger mode.

10. A system in accordance with claim 1, wherein said polarization bases are selected from the group consisting of linear, circular, elliptical and combinations thereof.

11. A method for quantum key delivery in a single-photon, free-space system comprising the steps of:

transmitting a photon having a polarization direction corresponding to a bit value from one of two non-orthogonal transmitter polarization basis systems through a transmitter polarizing beamsplitter, from said transmitter polarizing beamsplitter through a transmitter non-polarizing beamsplitter, through a photon output of a transmitter and into a photon input of a receiver; and passing said photon through a receiver non-polarizing beamsplitter, from said receiver non-polarizing beamsplitter through a receiver polarizing beamsplitter corresponding to one of two non-orthogonal receiver polarization basis systems, and to one of two photon detectors comprising said one of said two non-orthogonal receiver basis systems in said receiver.

12. A method in accordance with claim 11, wherein said photon is passed through a spatial filter disposed in a free-space channel between said transmitter and a receiver at said photon input of said receiver.

13. A method in accordance with claim 12, wherein said spatial filter comprises at least two optically aligned lenses and an optical barrier disposed between said optically aligned lenses and forming a pinhole aligned with said optically aligned lenses.

14. A method in accordance with claim 11, wherein said non-orthogonal bases are linear.

15. A method in accordance with claim 11, wherein said photons are randomly produced by one of two photon sources within a basis system.

16. A method in accordance with claim 11, wherein said photon detectors are photomultiplier tubes.

17. A method in accordance with claim 11, wherein said polarization bases systems are selected from the group consisting of linear, circular, elliptical, and combinations thereof.

* * * * *